US008964869B2

(12) United States Patent
Li et al.

(10) Patent No.: US 8,964,869 B2
(45) Date of Patent: Feb. 24, 2015

(54) PRE-CODING METHOD AND APPARATUS

(75) Inventors: Dong Li, Shanghai (CN); Liyu Cai, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 205 days.

(21) Appl. No.: 13/391,014

(22) PCT Filed: Aug. 18, 2009

(86) PCT No.: PCT/CN2009/073315
§ 371 (c)(1),
(2), (4) Date: Feb. 17, 2012

(87) PCT Pub. No.: WO2011/020238
PCT Pub. Date: Feb. 24, 2011

(65) Prior Publication Data
US 2012/0170675 A1   Jul. 5, 2012

(51) Int. Cl.
*H04B 7/02*     (2006.01)
*H04L 25/49*    (2006.01)
*H04B 7/04*     (2006.01)

(52) U.S. Cl.
CPC .............. *H04B 7/022* (2013.01); *H04B 7/0452* (2013.01); *H04B 7/0478* (2013.01)
USPC .......................................... 375/267; 375/296

(58) Field of Classification Search
USPC ................. 375/260, 267, 285, 295, 299, 316, 375/346–349; 370/208, 328, 334, 465
See application file for complete search history.

(56) References Cited

U.S. PATENT DOCUMENTS 8,229,017 B1 *  7/2012  Lee et al. .................... 375/267
8,238,307 B2    8/2012  Yang et al.
(Continued)

FOREIGN PATENT DOCUMENTS

CN      1956430 A     5/2007
CN    101370241 A     2/2009
(Continued)

OTHER PUBLICATIONS

Desheng, Wang, et al., "A Novel Coordinated Multi-Point Joint Processing Algorithm," Microelectroinics & Electronics, 2009. Asia Pacific Conference on Postgraduate Research In, IEE, Piscataway, New Jersey, USA, pp. 65-68.
(Continued)

*Primary Examiner* — Khanh C Tran
(74) *Attorney, Agent, or Firm* — Fay Sharpe LLP

(57) ABSTRACT

The present invention provides a pre-coding method in a multi-user macro-diversity transmission system. The method comprises: obtaining, for a mobile station in the multi-user macro-diversity transmission system, a first sub-precoder that guarantees orthogonality between equivalent channels of users; obtaining a second sub-precoder by performing QR decomposition based on equivalent channels precoded through the first sub-precoder; obtaining a final pre-coder with respect to the mobile station by combining the first sub-precoder and the second sub-precoder; and performing pre-coding on data of the mobile station with the final pre-coder The present invention further provides a corresponding base station and a multi-user macro-diversity transmission system. Through the technical solution of the present invention, the multi-user macro-diversity transmission system may achieve more macro-diversity gain, thereby greatly enhancing the performance of the multi-user macro-diversity transmission.

13 Claims, 4 Drawing Sheets

(56) References Cited

U.S. PATENT DOCUMENTS

| | | |
|---|---|---|
| 8,537,658 B2 * | 9/2013 | Sayana et al. .................. 370/210 |
| 2006/0274825 A1 * | 12/2006 | Cioffi et al. .................... 375/222 |
| 2007/0115799 A1 * | 5/2007 | Ting et al. ...................... 370/208 |
| 2007/0133691 A1 * | 6/2007 | Kozat ........................ 375/240.24 |
| 2009/0027242 A1 * | 1/2009 | Cideciyan et al. .............. 341/95 |
| 2011/0064156 A1 * | 3/2011 | Kim et al. ...................... 375/267 |

FOREIGN PATENT DOCUMENTS

| | | | |
|---|---|---|---|
| CN | 101394254 A | 3/2009 | |
| WO | WO2009/075456 A1 | 6/2009 | |

OTHER PUBLICATIONS

Umer Salim et al., "Multi-User Diversity Gain for Oblivious and Informed Users in Downlink Channels, Wireless Communications and Networking Conference," pp. 1-6, ISSNL 1525-3511, Apr. 8, 2009.

International Search Report for PCT/CN2009/073315 dated May 27, 2010.

* cited by examiner

PRE-CODING METHOD AND APPARATUS

FIELD OF THE INVENTION

The present invention relates to a pre-coding method and apparatus. In particular, the present invention relates to a pre-coding method and apparatus in a multi-user macro-diversity transmission system.

DESCRIPTION OF THE RELATED ART

In a multi-user macro-diversity transmission system, a plurality of base stations perform multi-input multi-output (MIMO) transmission with respect to a same mobile station. Each base station independently performs adaptive pre-coding. A plurality of base stations transmit same information to a mobile station. In other words, data services for the mobile station are duplicated in all coordination-related base stations.

When a plurality of base stations perform the above multi-input multi-output transmission with respect to multiple users in a plurality of different cells, it is needed to perform coordinated pre-coding. FIG. 1 is an example of coordinated pre-coding in a multi-user macro-diversity transmission system. During the coordinated pre-coding process, base station 1 and base station 2 independently perform single-base-station multi-user adaptive pre-coding with respect to a plurality of mobile stations such as mobile station 1 and mobile station 2, wherein each mobile station has a stream. For example, base station 1 duplicates data (x1, x2, x3, ...) with respect to mobile station 1 and data (y1, y2, y3, ...) with respect to mobile station 2 from the core network, performs multi-input and multi-output coding and pre-coding with respect to the above data, respectively, and transmits the corresponding data stream to the mobile station 1 and mobile station 2 through a plurality of transmit antennas, respectively. Likewise, base station 2 performs a similar operation to base station 1 and transmits the pre-encoded data stream to mobile station 1 and mobile station 2, respectively.

As far as the performance is concerned, a best existing solution of multi-user pre-coding in a multi-user macro-diversity transmission system is a so-called "dirty paper coding," which solution is based on a multi-user composite channel (i.e., so-called global channel). However, high complexity of dirty paper coding is rather difficult in implementation.

As far as the implementation feasibility is concerned, a best existing solution of multi-user pre-coding in a multi-user macro-diversity transmission system is local Block Diagonization pre-coding, wherein the pre-coding is implemented by performing singular value decomposition to the multi-user channel. However, this solution has a drawback that it is difficult for the user to obtain enough macro-diversity gain.

Accordingly, the existing pre-coding methods adopted in a multi-user macro-diversity transmission system have certain limitation. Therefore, it is desirable for a new pre-coding solution that may further utilize a potential macro-diversity gain while guaranteeing that a user correctly receiving his/her own data stream in a multi-user composite channel.

SUMMARY OF THE INVENTION

The present invention aims to provide an enhanced pre-coding solution for a multi-user macro-diversity transmission.

According to a first aspect of the present invention, there is provided a pre-coding method in a multi-user macro-diversity transmission system. The method comprises: obtaining, for a mobile station in the multi-user macro-diversity transmission system, a first sub-precoder that guarantees orthogonality between equivalent channels of users; obtaining a second sub-precoder by performing QR decomposition based on equivalent channels precoded through the first sub-precoder; obtaining a final pre-coder with respect to the mobile station by combining the first sub-precoder and the second sub-precoder; and performing pre-coding on data of the mobile station with the final precoder.

According to a second aspect of the present invention, there is provided a base station in a multi-user macro-diversity transmission system. The base station comprises a pre-coding module for performing pre-coding with respect to data of respective users. The pre-coding module comprises: a first sub-precoding means configured to obtain, for a mobile station in the multi-user macro-diversity transmission system, a first sub-precoder that guarantees orthogonality between equivalent channels of users; a second sub-precoding means configured to obtain a second sub-precoder by performing QR decomposition based on equivalent channels precoded through the first sub-precoder. The pre-coding module combines the first sub-precoder and the second sub-precoder to obtain a final pre-coder with respect to the mobile station, and performs pre-coding on data of the mobile station with the final precoder.

According to a third aspect of the present invention, there is provided a multi-user macro-diversity transmission system. The system comprises: a plurality of mobile stations and a plurality of base stations according to the present invention, wherein macro-diversity data transmission is performed between the plurality of mobile stations and the plurality of base stations.

The technical solution according to the present invention enables a plurality of macro-diversity data transmission with respect to the particular mobile station to be substantively in the same direction, such that at the particular mobile station, an enhanced macro-diversity gain may be obtained through combining in the same direction, particularly in the case that each user has a plurality of data streams. Moreover, according to the present invention, even if no additional cooperative coordination is performed between a plurality of involved base stations, the enhanced macro-diversity gain may also be obtained. Therefore, a higher macro-diversity gain may be achieved in a system implementation without increasing signaling load as long as all base stations are enabled to execute the pre-coding solution according to the present invention.

BRIEF DESCRIPTION OF THE DRAWINGS

Other objectives and effects of the present invention will become much clearer and easier to understand through the following description with reference to the accompanying drawings and with more comprehensible understanding of the present invention, wherein.

DETAILED DESCRIPTION OF THE INVENTION

Embodiments of the present invention provide an enhanced pre-coding solution for macro-diversity transmission. Through using the technical solution according to the present invention, macro-diversity gain of a multi-user macro-diversity transmission system may be improved through the improved pre-coding solution.

A basic idea of the present invention lies in that by adopting the pre-coding solution according to the present invention at base stations in a multi-user macro-diversity transmission system, equivalent channels from the base stations to each of a plurality of mobile stations in the multi-user macro-diversity transmission system are substantially orthogonal with respect to the equivalent channels of other mobile stations, so as to mitigate series interference between users; and the signals transmitted from a plurality of base stations with respect to a same mobile station are substantially in a same direction, so as to obtain a considerable macro gain at the mobile station.

According to the technical solution of the present invention, when performing downlink data transmission, in order to transmit data from a core network to mobile stations as users, a cell will perform local multi-user pre-coding, and the pre-coding process is performed with respect to each user of each base station.

Figure 1:
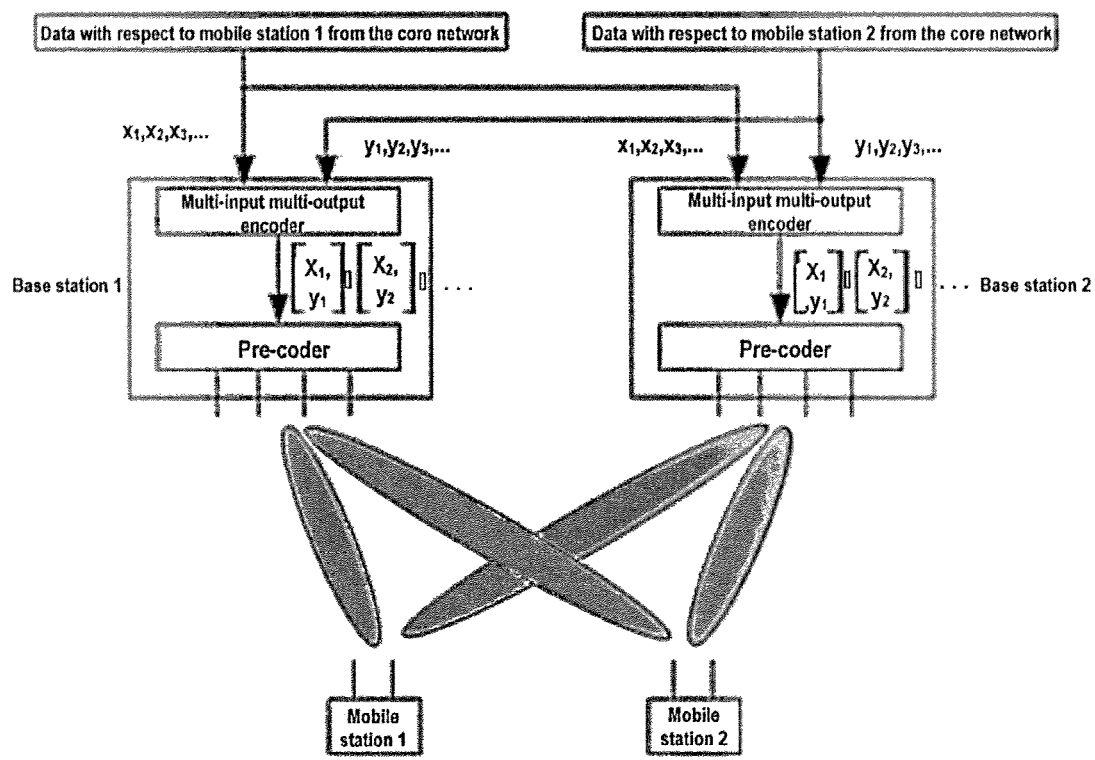
FIG. 1 is an example of coordinated pre-coding in a multi-user macro-diversity transmission system.
Figure 2:
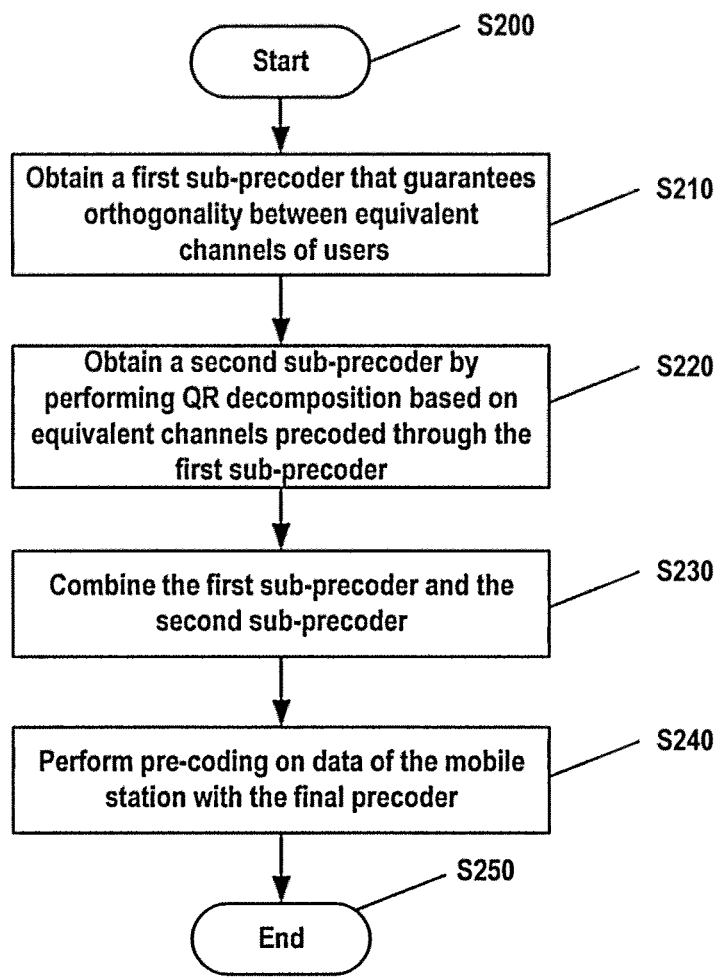
FIG. 2 schematically illustrates a flow chart of performing pre-coding in a base station of a multi-user macro-diversity transmission system according to an embodiment of the present invention.

FIG. 2 schematically illustrates a flow chart of performing pre-coding in a base station of a multi-user macro-diversity transmission system according to an embodiment of the present invention.

At step S200, the pre-coding process starts.

At step S210, a first sub-precoder that guarantees orthogonality between equivalent channels of users is obtained for users in a multi-user macro-diversity transmission system, for example, a mobile station i.

Specifically, the first sub-precoder for each mobile station resides in a nulling space of a composite channel formed by channels of other users.

Suppose each mobile station in the plurality of mobile stations feeds back an equivalent channel matrix (or vector) $pcH_{k,i}$ (wherein, i=1, 2, ..., M, i denotes an index of a mobile station) to its serving cell k. $pcH_{k,i}$ is an S×Nt matrix (or vector), wherein S denotes the number of data streams to be transmitted to the mobile station i, and Nt denotes the number of transmit antennas at the base station.

For the mobile station i, a composite channel formed with respect to other mobile stations (users) may be denoted as $cpsH_i$, wherein:

$$cpsH_i = \begin{bmatrix} pcH_{k,1} \\ pcH_{k,2} \\ \vdots \\ pcH_{k,i-1} \\ pcH_{k,i+1} \\ \vdots \\ pcH_{k,m} \end{bmatrix} \qquad 1)$$

According to an exemplary embodiment of the present invention, in order to obtain the first sub-precoder, the composite channel may be subjected to singular value decomposition, which is expressed as:

$$cpsH_i = USV^H \qquad 2)$$

wherein V denotes a right singular matrix, which forms the direction of a standard orthogonal input basic vector of the matrix $cpsH_i$; U denotes a left singular matrix, which forms the direction of a standard orthogonal output basic vector of the matrix $cpsH_i$; while S denotes a diagonal matrix including singular values of the composite channel $cpsH_i$. Here, it is supposed that the singular values are ordered from left to right in a non-ascending order.

Therefore, a nulling space generation vector $W_{null}$ may be extracted in the following manner as the first sub-precoder:

$$W_{null} = V(:,(M-1)*S+1:end) \qquad 3)$$

Equation 3) denotes extracting the last Nt−(M−1)*S columns of the right singular matrix V as the i nulling space generation vector of $cpsH_i$, i.e., the first sub-precoder.

Accordingly, through performing the above steps, a first sub-precoder $W_{null}$ that guarantees orthogonality between equivalent channels of users may be obtained.

It should be noted that the above described exemplary process of obtaining the first sub-precoder substantially exploits the so-called singular value decomposition-based block diagonization approach. The first sub-precoder may also be obtained through any known algorithm in the prior art. For example, those skilled in the art may also obtain the nulling first pre-coder matrix through performing a characteristic value decomposition-based block diagonization approach, i.e., performing characteristic value decomposition on the matrix resulted by multiplying conjugate transpose of $cpsH_i$ by the matrix $cpsH_i$, or obtain the nulling first sub-precoder matrix through a zero-forcing approach.

At step S220, QR decomposition is performed based on the equivalent channels pre-coded through the first sub-precoder, namely, combining the physical channel and nulling space generation orthogonal vector (it $W_{null}$ in this embodiment), thereby obtaining a second sub-precoder.

According to the embodiments of the present invention, the fed back equivalent channels and the nulling space generation vector are combined, where the combined channel is marked as $cbH_i$, which is a S×(Nt−(M−1)*S), wherein $$cbH_i = pcH_i W_{null} \qquad 4)$$

The combined channel $cbHi$ is subjected to QR decomposition:

$$cbH_i^H = QR \qquad 5)$$

wherein $^H$ denotes the conjugate transpose of the matrix, Q denotes the unitary matrix of (Nt−(M−1)*S)×S; and R denotes the upper triangular matrix of S×S.

The QR decomposition may be actually calculated with various algorithms, for example, Givens rotation, Householder transformation, and Gram-Schmidt orthogonalization, etc. How to specifically calculate the QR decomposition does not constitute any limitation to the present invention, and thus the depiction of QR decomposition calculation is omitted here.

The second sub-precoder $W_2$ is determined based on the QR decomposition performed to the combined channel $cbH_i$:

$$W_2 = QD_{iagSign}(R) \qquad 6)$$

wherein, the function of $D_{iagSign}(\cdot)$ outputs a diagonal matrix with diagonal elements +1 or −1, while the positive or negative signs of the diagonal elements depend on the diagonal elements of its input matrix. Specifically, for equation 6), the diagonal elements in the diagonal matrix outputted by $D_{iagSign}(R)$ depend on the positive or negative of the diagonal elements of the ma to correspondingly take +1 or −1.

Through the second sub-precoder, the diagonal elements of the pre-coded final equivalent channel matrix may be modified to be positive integer utilizing the QR decomposition. When the equivalent channel matrixes of a plurality of base stations in the multi-user macro-diversity transmission system with respect to a particular mobile station are modified to be integers with diagonal elements, a plurality of macro-diversity data with respect to the particular mobile station may be transmitted in substantial same direction, such that an enhanced macro-diversity gain may be obtained through combining in the same direction.

At step S230, the first and second pre-coders are combined through concatenation of the first and second sub-precoders, thereby obtaining a final pre-coder with respect to the mobile station i.

$$W = W_{null} W_2 \qquad 7)$$

At step S240, pre-coding is performed to data of the corresponding mobile station i utilizing the final pre-coder.

At step S250, the pre-coding process ends.

In the multi-user macro diversity transmission system, the above pre-coding process is performed for each user (mobile station 1-mobile station M) in each base station.

Figure 3:
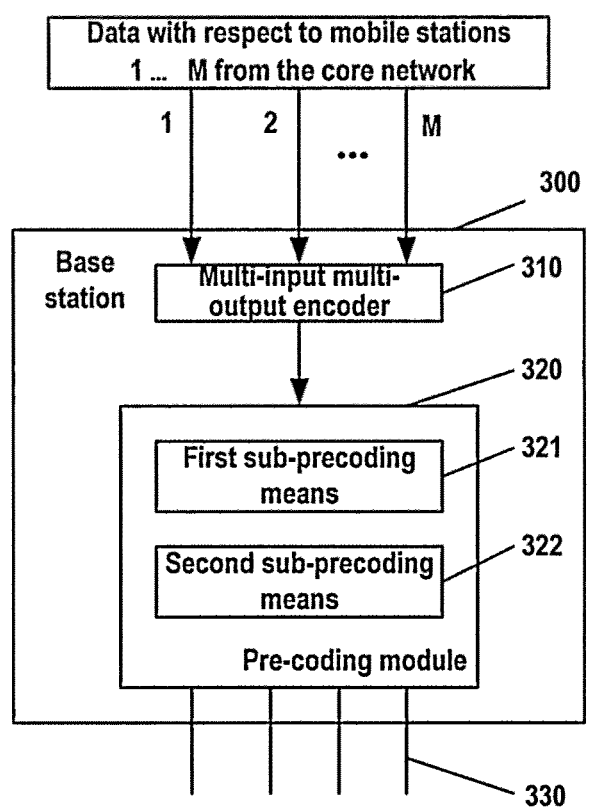
FIG. 3 schematically illustrates a block diagram of functions of a base station of a multi-user macro-diversity transmission system according to an embodiment of the present invention.

FIG. 3 schematically illustrates a block diagram of functions of a base station of a multi-user macro-diversity transmission system according to an embodiment of the present invention. In this embodiment, reference numeral 300 denotes a base station in the multi-user macro diversity transmission system; reference numeral 310 denotes a multi-input multi-output coder; reference numeral 320 denotes a pre-coding module for pre-coding data of each user; and reference numeral 330 denotes a plurality of transmit antennas of the base station.

As illustrated in FIG. 3, the pre-coding module 320 performs pre-coding on data of each user. According to the embodiment of the present invention, the pre-coding module 320 comprises a first sub-precoding means 321 and a second sub-precoding means 322; a final pre-coder for each mobile station is obtained by concatenating the first and second sub-precoding means and combining the first and second pre-coder.

The first sub-precoding means 321 is for obtaining a first pre-coder that guarantees the orthogonality between equivalent channels of users. For example, a nulling space generation vector of a composite channel formed by the mobile station i with respect to other mobile stations (users) may be obtained by performing singular value decomposition to the composite channel, as the first sub-precoder.

The second sub-precoding means 322 is used for obtaining a second pre-coder by performing QR decomposition to the equivalent channels pre-coded through the first sub-precoder obtained by the first pre-coding means 321, wherein the second sub-precoder modifies diagonal elements of a pre-encoded final equivalent channel matrix to be positive integer.

The pre-coding module 320 combines the first and second pre-coders provided by the first pre-coding means 321 and the second pre-coding means 322, respectively, thereby obtaining a final pre-coder for each mobile station. The pre-coding module 320 performs pre-coding to data of each mobile station by utilizing the final pre-coder.

It should be noted that in the pre-coding module 320, it is needed to determine a final pre-coder for each mobile station, and then perform pre-coding to data of each mobile station utilizing the final pre-coder.

Those skilled in the art would appreciate that in the calculation of determining a pre-coder through the first pre-coding means 321 and the second pre-coding means 322 in the Pre-coding module 320, it is needed to provide feedback physical channel information between each mobile station and the base station 300 through for example channel estimation (not shown in FIG. 3). However, in order to better embody the focus of the present invention, some known technical details (such as feedback channel, channel estimation module, etc.) in the art are not depicted in FIG. 3. Those skilled in the art may use corresponding functional modules on the basis of the block diagrams of the functions of the base station 300 of FIG. 3, so as to implement the entire function in the base station.

Besides, those skilled in the art would appreciate that the pre-coding module 320 may be implemented in any suitable manner in the art, for example, implemented as hardware, or implemented as a computer program instruction of a firmware or software. In this embodiment, the hardware may be a dedicated circuit, for example, an application-specific integrated circuit (ASIC), or a programmable circuit, for example, a digital signal processor (DSP) and a field programmable gate array (FPGA), etc.

The embodiments of the present invention at least have the following advantage: more macro-diversity gain may be achieved for the multi-user macro-diversity transmission system, particularly in the case that each user has a plurality of data streams. In this way, the performance of multi-user macro-diversity transmission may be greatly enhanced. Moreover, according to the technical solution of the present invention, another advantage lies in that even if no additional cooperative coordination is performed between a plurality of involved base stations, the enhanced macro-diversity gain may also be obtained. Thus, according to the technical solution of the present invention, an advantage of higher macro-diversity gain may be achieved in system implementation without increasing signaling load, as long as all the base stations are subjected to the Pre-coding solution of the present invention.

Figure 4:
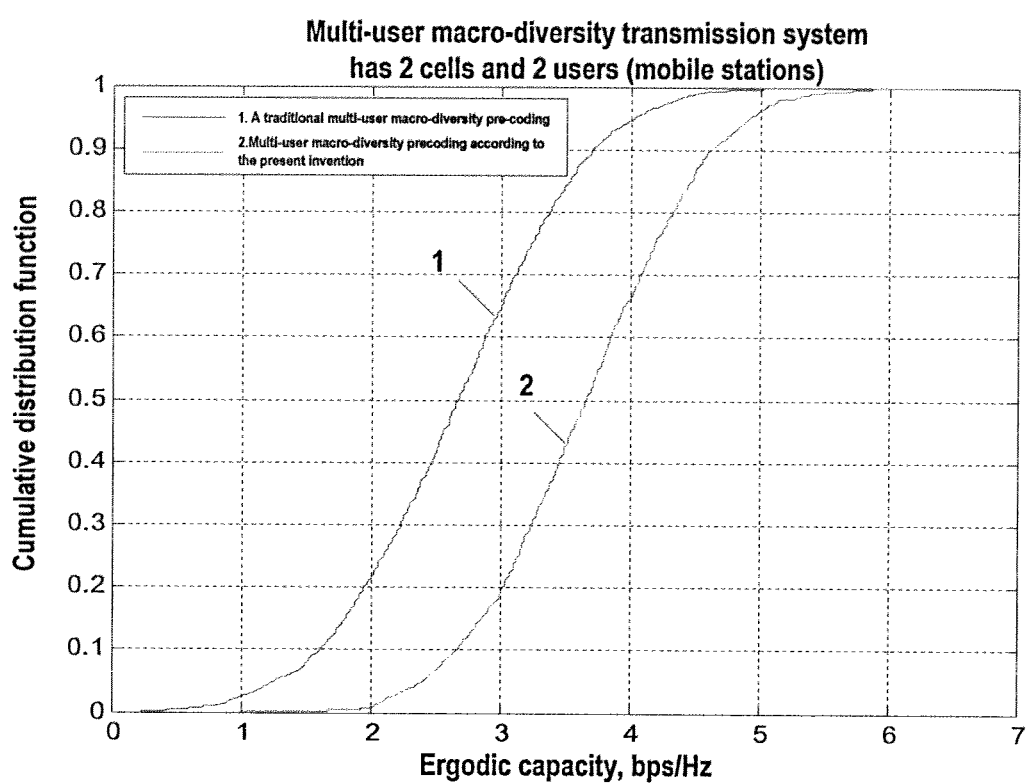
FIG. 4 is a simulation diagram of comparing performances between pre-coding performed according to an embodiment of the present invention and traditional pre-coding.

FIG. 4 is a simulation diagram of comparing performances between pre-coding performed according to an embodiment of the present invention and traditional pre-coding.

Simulation conditions are specified in Table 1.

TABLE 1

| | |
|---|---|
| Number of cells and number of transmit antennas | 2 base stations, each with 4 transmit antennas |
| Number of mobile stations and number of receive antennas | 2 mobile stations with 2 receive antennas. |
| Number of data streams per MS | 2 |
| Path loss and shadow fading | large-scale fading is assumed to be the same in multiple cells |
| Channel model | Independent Rayleigh channel |
| Bandwidth | One subcarrier assumed |
| Feedback transmission | Ideal |
| Channel estimation | Ideal |
| Signal power and noise power | Sum transmission power per UE (minus the large scale attenuation) is assumed to be two times the noise power at the receiver |

From the simulation results, it may be seen that the performance of the pre-coding method in a multi-user macro-diversity system is apparently better than the traditional method, whose capacity is enhanced by about 1 bps/Hz.

The purpose for providing the description of the present invention is to explain and describe, not to exhaust or limit the present invention within the disclosed form. To a person of normal skill in the art, various modifications and alternations are obvious. The skilled in the art may further understand, the method and apparatus in the embodiments of the present invention may be implemented through software, hardware, firmware, or their combination.

Thus, selecting and describing the preferred embodiments is to better illustrate the principle and practical application of the present invention and to enable a person of normal skill in the art to appreciate that without departing the spirit of the present invention, all modifications and alterations fall within the protection scope of the present invention as limited by the appending claims.

What is claimed is:

1. A pre-coding method in a multi-user macro-diversity transmission system, comprising:
   obtaining, for a mobile station in the multi-user macro-diversity transmission system, a first sub-precoder that guarantees orthogonality between equivalent channels of users;
   obtaining a second sub-precoder by performing QR decomposition based on equivalent channels precoded through the first sub-precoder;
   obtaining a final pre-coder with respect to the mobile station by combining the first sub-precoder and the second sub-precoder; and
   performing pre-coding on data of the mobile station with the final precoder.

2. The method according to claim 1, wherein in the multi-user macro-diversity transmission system, the pre-coding method is performed at each base station for each mobile station.

3. The method according to claim 1, wherein the second sub-precoder modifies diagonal elements of a precoded final equivalent channel matrix to be positive integer.

4. The method according to claim 3, wherein the equivalent channel precoded through the first sub-precoder is $cbH_i$, and a QR decomposition may be expressed as:

$$cbH_i^H = QR$$

wherein, i denotes an index of a mobile station in the multi-user macro-diversity transmission system, $^H$ denotes a conjugate transpose of the matrix, Q denotes a unitary matrix of $(Nt-(M-1)*S) \times S$; R denotes an upper triangular matrix of $S \times S$, where M denotes the number of mobile stations in the multi-user macro-diversity transmission system; Nt denotes the number of transmit antennas at the base station, and S denotes the number of data streams transmitted for the mobile station; and
wherein the second sub-precoder is determined as:

$$W_2 = QD_{iagSign}(R)$$

wherein, the function of $D_{iagSign}(\bullet)$ outputs a diagonal matrix with diagonal elements +1 or −1, while the positive or negative symbols of the diagonal elements depend on the diagonal elements of its input matrix.

5. The method according to claim 1, wherein the first pre-coder of the mobile station resides in a nulling space of a composite channel formed by other users in the multi-user macro-diversity transmission system.

6. The method according to claim 5, wherein a first pre-coder is obtained through an algorithm from a group at least comprising the following algorithms:
   a block diagonalization based on singular value decomposition or a characteristic value decomposition; and
   zero-forcing.

7. A base station in a multi-user macro-diversity transmission system, said base station comprising:
   a pre-coding module for pre-coding data of each user, the pre-coding module including:
   a first sub-precoder configured, for a mobile station in the multi-user macro-diversity transmission system, to guarantee orthogonality between equivalent channels of users; and
   a second sub-precoder configured to perform QR decomposition based on equivalent channels precoded through the first sub-precoder;
   wherein the pre-coding module combines the first sub-precoder and the second sub-precoder to obtain a final pre-coder with respect to the mobile station, and performs pre-coding on data of the mobile station with the final precoder.

8. The base station according to claim 7, wherein the pre-coding module is configured to perform a pre-coding process for each mobile station in the multi-user macro-diversity transmission system.

9. The base station according to claim 7, wherein the second sub-precoder modifies diagonal elements of a precoded final equivalent channel matrix to be positive integer.

10. The base station according to claim 9, wherein the equivalent channel precoded through the first sub-precoder is cbHi, and a QR decomposition may be expressed as:

$$cbH_i^H = QR$$

wherein, i denotes an index of a mobile station in the multi-user macro-diversity transmission system, $^H$ denotes a conjugate transpose of the matrix, Q denotes a unitary matrix of $(Nt-(M-1)*S) \times S$; R denotes an upper triangular matrix of $S \times S$, where M denotes the number of mobile stations in the multi-user macro-diversity transmission system; Nt denotes the number of transmit antennas at the base station, and S denotes the number of data streams transmitted for the mobile station; and
wherein the second sub-precoder is determined as:

$$W_2 = QD_{iagSign}(R)$$

wherein, the function of $D_{iagSign}(\bullet)$ outputs a diagonal matrix with diagonal elements +1 or −1, while the positive or negative symbols of the diagonal elements depend on the diagonal elements of its input matrix.

11. The base station according to claim 7, wherein the first pre-coder of the mobile station resides in a nulling space of a composite channel formed by other users in the multi-user macro-diversity transmission system.

12. The base station according to claim 11, wherein a first pre-coder is obtained through an algorithm from a group at least comprising the following algorithms:
   a block diagonalization based on singular value decomposition or a characteristic value decomposition; and
   zero-forcing.

13. A multi-user macro-diversity transmission system, comprising:
   a plurality of mobile stations; and
   a plurality of base stations according to claim 7;
wherein macro-diversity data transmission is performed between the plurality of mobile stations and the plurality of base stations.

* * * * *